US012710859B2

(12) United States Patent
Ye et al.

(10) Patent No.: US 12,710,859 B2
(45) Date of Patent: Aug. 18, 2026

(54) DYNAMIC USER INTERFACE MANAGEMENT PLATFORM

(71) Applicant: Nuvolo Technologies Corporation, Paramus, NJ (US)

(72) Inventors: Tao Ye, Cypress, TX (US); Christo Kojouharov, Sofia (BG); Hristiyan Yaprakov, Paramus, NJ (US); Kristiyan Nikolov, Paramus, NJ (US)

(73) Assignee: NUVOLO TECHNOLOGIES CORPORATION, Davidson, NC (US)

( * ) Notice: Subject to any disclaimer, the term of this patent is extended or adjusted under 35 U.S.C. 154(b) by 150 days.

(21) Appl. No.: 18/394,599

(22) Filed: Dec. 22, 2023

(65) Prior Publication Data

US 2024/0220087 A1 Jul. 4, 2024

Related U.S. Application Data

(60) Provisional application No. 63/436,422, filed on Dec. 30, 2022.

(51) Int. Cl.
*G06F 3/0484* (2022.01)
*G06F 3/0482* (2013.01)
*G06F 9/451* (2018.01)

(52) U.S. Cl.
CPC .......... *G06F 3/0484* (2013.01); *G06F 3/0482* (2013.01); *G06F 9/451* (2018.02)

(58) Field of Classification Search
CPC ...... G06F 3/0484; G06F 3/0482; G06F 9/451; G06F 8/38
See application file for complete search history.

(56) References Cited

U.S. PATENT DOCUMENTS

2008/0168368 A1* 7/2008 Louch .................. G06F 3/0488 715/764
2009/0055369 A1* 2/2009 Phillips .............. G06F 16/9535
2011/0231790 A1* 9/2011 Forstall ................ G06F 3/0482 715/779
2014/0215309 A1* 7/2014 Lee .................... G06F 21/6227 715/234
2016/0179359 A1* 6/2016 Kodejs ................. G06F 3/0481 715/763
2017/0109136 A1* 4/2017 Colle ....................... G06F 8/20
2017/0193117 A1* 7/2017 Reigen ............... G06F 16/9535
(Continued)

FOREIGN PATENT DOCUMENTS

WO WO-2015092803 A1 * 6/2015 .............. G06F 8/36

*Primary Examiner* — Nicholas Ulrich
(74) *Attorney, Agent, or Firm* — Womble Bond Dickinson (US) LLP

(57) ABSTRACT

Methods, systems, and storage media for providing a dynamic user interface management platform are disclosed. Exemplary implementations may: receive, at a user interface and using at least one processor associated with a user interface management platform, a selection of a widget to include in a customized dashboard; provide, at the user interface and by the user interface management platform, an editable property of the selected widget; receive, at the entry field and using the at least one processor, the script for controlling a behavior of the editable property of the selected widget; and control, using the at least one processor and as a result of the received customized script, the behavior of the selected widget.

20 Claims, 10 Drawing Sheets

(56) References Cited

U.S. PATENT DOCUMENTS

2019/0108046 A1* 4/2019 Spencer-Harper ...... G06F 9/451
2022/0261139 A1* 8/2022 Phoutchanthavongsa .................. G06F 9/451
2023/0221930 A1* 7/2023 Ma ............................ G06F 8/38 717/106

* cited by examiner

ACTION EDITOR
Label
Update via Rest
Hidden
Disabled
On Click
English
Name *
Work Order Type
Mod Count
TD3
Device Verification
Asset Count
Assets Filter Type
Assignment Group
11112
Assets
Active
602
Cancel

DYNAMIC USER INTERFACE MANAGEMENT PLATFORM

CROSS-REFERENCE TO RELATED APPLICATIONS

This application claims the benefit of U.S. Provisional Application Ser. No. 63/436,422, filed Dec. 30, 2022, entitled "Dynamic User Interface Management Platform", the contents of which are incorporated by reference herewith in its entirety.

TECHNICAL FIELD

This disclosure relates to methods and systems for user interfaces, and more specifically to methods and systems for providing a dynamic user interface management platform.

BACKGROUND

A user interface may present information to a user using visual elements known as widgets. Some types of widgets may include, for example, forms, tables, charts, lists, and the like. A user interface may be configured by organizing widgets on a display area of a screen, e.g., a dashboard. For example, a website that presents data to a user may be organized as a collection of tables, charts, and/or graphs arranged on a dashboard that serves as a canvas for the website. A user may control the arrangement of these visual elements on the website by manipulating graphic representations of the visual elements on the dashboard or a graphic representation of the dashboard.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

One aspect of the present disclosure relates to a method for providing a dynamic user interface management platform. The method may include receiving, at a user interface and using at least one processor associated with a user interface management platform, a selection of a widget to include in a customized dashboard. The method may include providing, at the user interface and by the user interface management platform, an editable property of the selected widget. The editable property associated with an entry field for may receive a script to assign to the editable property. The method may include receiving, at the entry field and using the at least one processor, the script for controlling a behavior of the editable property of the selected widget. The method may include controlling, using the at least one processor and as a result of the received customized script, the behavior of the selected widget.

Another aspect of the present disclosure relates to a system configured for providing a dynamic user interface management platform. The system may include one or more hardware processors configured by machine-readable instructions. The processor(s) may be configured to receive, at a user interface and using at least one processor associated with a user interface management platform, a selection of a widget to include in a customized dashboard. The processor (s) may be configured to provide, at the user interface and by the user interface management platform, an editable property of the selected widget. The editable property associated with an entry field for may receive a script to assign to the editable property. The processor(s) may be configured to receive, at the entry field and using the at least one processor, the script for controlling a behavior of the editable property of the selected widget. The processor(s) may be configured to control, using the at least one processor and as a result of the received customized script, the behavior of the selected widget.

Yet another aspect of the present disclosure relates to a non-transient computer-readable storage medium having instructions embodied thereon, the instructions being executable by one or more processors to perform a method for providing a dynamic user interface management platform. The method may include receiving, at a user interface and using at least one processor associated with a user interface management platform, a selection of a widget to include in a customized dashboard. The method may include providing, at the user interface and by the user interface management platform, an editable property of the selected widget. The editable property associated with an entry field for may receive a script to assign to the editable property. The method may include receiving, at the entry field and using the at least one processor, the script for controlling a behavior of the editable property of the selected widget. The method may include controlling, using the at least one processor and as a result of the received customized script, the behavior of the selected widget.

BRIEF DESCRIPTION OF THE DRAWINGS

Like reference numbers and designations in the various drawings indicate like elements.

DETAILED DESCRIPTION

A customized dashboard or user interface layout may be assembled in response to a user selecting one or more widgets to populate the customized dashboard. Each widget may be configured to display and receive data in a variety of ways, including displaying information in the form of a chart, a list, a form, etc. The selected widgets may be displayed for efficient viewing and/or user interaction in the customized dashboard. A user interface management platform of the present disclosure may allow for further customizing of the selected widgets in order to control the behavior of one or more properties of any widget. For example, the user interface management platform may allow a user to change any widget property by either entering a value or writing a script to dynamically evaluate the property, thereby creating complex, efficient, and effective control of widgets and dashboard layouts.

Some advantages of the user interface management platform may include the ability to efficiently control the behavior of one or more properties of a widget by assigning a customized script to the one or more properties of the widget. For example, the user interface management platform allows a user to assign a customized script to a selected property of a selected widget and to control the behavior of the selected property. For example, the user interface management platform may use the customized script to control the user interaction with the selected widget and/or to control the displaying of information by the selected widget. For performance optimizations, the platform may automatically analyze property code to determine reactive relationships between properties and widgets and may only execute evaluations when a dependent state changes. Such customized control over the behavior of selected properties of widgets may improve the user experience and efficiency of viewing and interacting with the customized widgets, such as for obtaining and viewing information for business and personal use.

Figure 1:
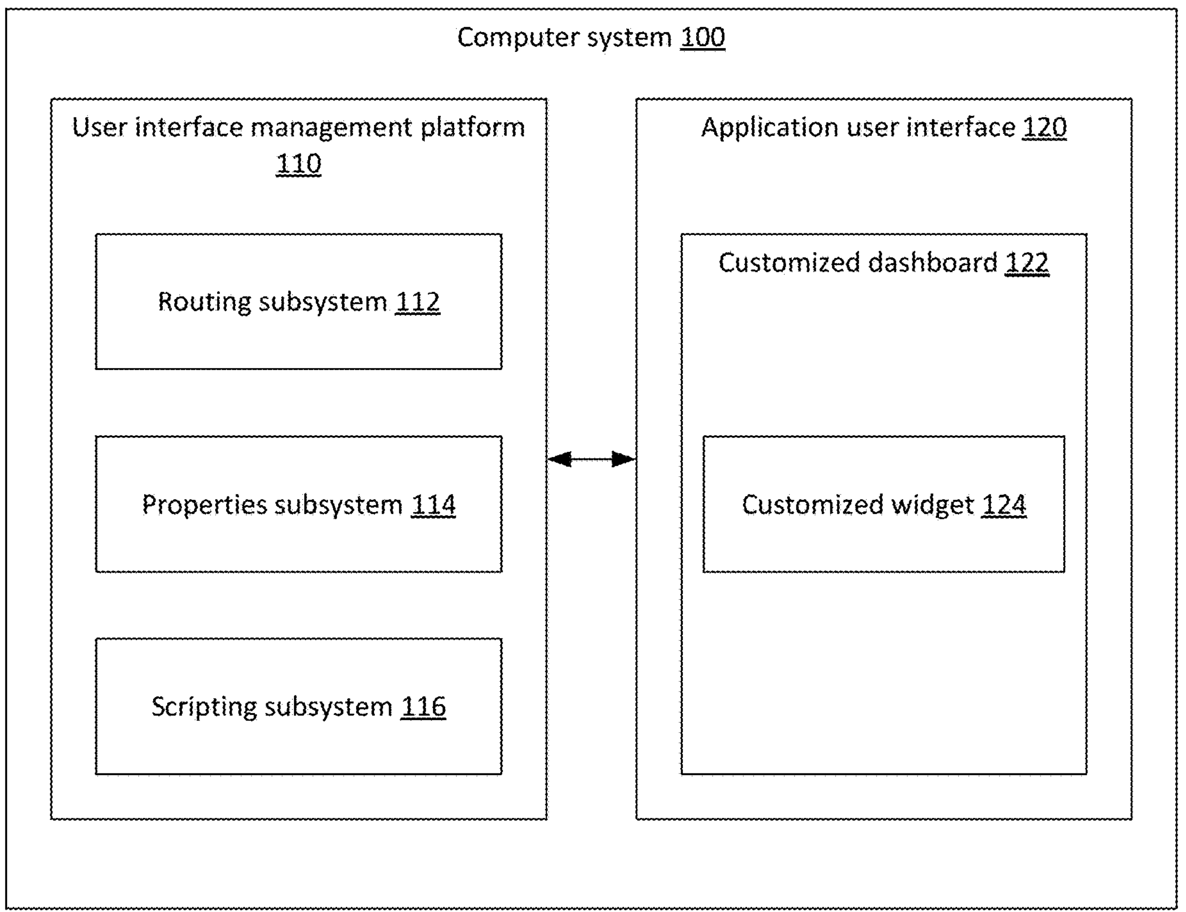
FIG. 1 illustrates an example computing system for providing a dynamic user interface management platform, according to some embodiments of the present disclosure.

FIG. 1 illustrates an example computer system 100 for providing a dynamic user interface management platform, according to some embodiments of the present disclosure. In some embodiments, the computer system 100 may include one or more of a user interface management platform 110, an application user interface 120, and/or other components. The user interface management platform 110 may include one or more of a routing subsystem 112, a properties subsystem 114, or a scripting subsystem 116. The application user interface 120 may include one or more of a customized dashboard 122 or a customized widget 124.

Some widgets have properties. Properties may include names, types, and other characteristics. Some properties may be complex. For example, some widgets may be configured to exhibit certain behaviors in response to particular criteria. These behaviors and triggering criteria may be characterized using scripts. Some user interface management platforms lack the ability to associate such scripts with widgets, potentially limiting the functionality of widgets in such platforms and adversely affecting the user experience.

Implementations described herein address the aforementioned shortcomings and other shortcomings by providing methods, apparatuses, and/or systems to generate and/or configure a dashboard or user interface layout. In some implementations, a user may select one or more widgets to populate a dashboard. Each widget may be configured to display and/or receive data in any of a variety of ways, including, for example, displaying information in the form of a chart, a list, a form, and the like. Selected widgets may be displayed for efficient viewing and/or user interaction in the dashboard. In some implementations, a user interface management platform allows further customizing of the selected widgets to control the behavior of one or more properties of one or more widgets. For example, a user may change a widget property by entering a value or by creating a script to dynamically evaluate the widget property. In this way, the user interface management platform may facilitate the efficient and effective control of complex widgets and dashboard layouts.

In some implementations, the user interface management platform 110 may control the generation and/or the display of a user interface. The user interface management platform 110 may include one or more subsystems that perform various functions related to generating and/or displaying the user interface.

For example, in some implementations, the routing subsystem 112 may receive a request to generate or modify an application user interface 120. The routing subsystem 112 may, for example, receive a user input corresponding to a selection of a widget to include in a customized dashboard 122, e.g., a selection of an item from a menu, a text command, and/or a spoken command. The user input corresponding to the selection of the widget may be received in response to a displayed set of available widgets. In some implementations, the routing subsystem 112 parses the user input and determines a task to perform based on the user input. For example, the routing subsystem 112 may determine to instantiate a particular type of widget based on the user input. Based on the determined type of widget, the routing subsystem 112 may, for example, select a template for instantiating the widget. The routing subsystem 112 may determine what data, if any, to obtain for instantiating the widget. Data may be obtained from any of a variety of sources, including, for example, an electronic storage 824 of FIG. 8 and/or remote platform(s) 804 and/or external resources 822 of FIG. 8. In some implementations, the widget may be included in the customized dashboard 122. Including the widget in the customized dashboard 122 may include associating a graphic representation of the widget with the customized dashboard 122. In some implementations, including the widget in the customized dashboard 122 may include associating an identifier of the widget, such as a name of the widget, with the customized dashboard 122.

In some implementations, the properties subsystem 114 may provide an editable property of the selected widget. The editable property may be associated with an entry field for receiving a script to assign to the editable property. The editable property may include, for example, a name and/or a type of the selected widget. Some editable properties may control access to the selected widget, e.g., visibility and/or operability of the selected widget or whether the selected widget may be written to.

In some implementations, the editable property may be characterized by a behavior. For example, an editable property may be characterized in that the selected widget is read-only with respect to certain users, but write-capable with respect to other users. As another example, an editable property may be characterized in that the selected widget is disabled for one or more specific users. A disabled widget may not be displayed and/or selected or may not be operable with respect to one or more specific users, e.g., users with a security clearance level that is less than a threshold security clearance level. As another example, an editable property may be characterized in that the selected widget is hidden for one or more specific users or is only visible to one or more specific users.

Behaviors of widgets may be characterized using scripts. For example, a widget may have a property that causes the widget to be read-only when accessed by some users, but write-capable when accessed by other users. A script to cause the widget to behave in this way may cause the widget to determine an identity or access level of a user. If the identity of the user belongs to a set of specified user identities, the script may cause the widget to be read-only. As another example, the access level of the user may be evaluated against, e.g., a threshold access level or a functional classification (e.g., database administration, administrative support, etc.). The script may cause the widget to be either read-only or write-capable based on the access level of the user and the threshold access level and/or the functional classification. For example, the script may include instructions that may cause a value (e.g., 0 or 1) to be assigned to the property. A value of 0 may indicate a read-only widget, while a value of 1 may indicate a write-capable widget.

In some implementations, the scripting subsystem 116 may receive a script for controlling a behavior of the editable property of the selected widget. The scripting subsystem 116 may select a script from multiple scripts based on desired rules or conditions to apply to the script. In some implementations, the scripting subsystem 116 may generate (e.g., synthesize) the script based on desired rules or conditions to apply to the script.

In this way, the user interface management platform 110 may instantiate a selected widget having editable properties that may be determined by a script received by the scripting subsystem 116. The selected widget may be instantiated as a customized widget 124 and may be associated with the customized dashboard 122. Associating the customized widget 124 with the customized dashboard 122 may include associating a graphic representation of the customized widget 124 with the customized dashboard 122. For example, the graphic representation of the customized widget 124 may be displayed in connection with the customized dashboard 122. One or more points of the graphic representation of the customized widget 124 may be associated with one or more locations of the customized dashboard 122, such that the graphic representation of the customized widget 124 may move or change size or shape when the customized dashboard 122 is moved or altered. In some implementations, including the customized widget 124 in the customized dashboard 122 may include associating an identifier of the customized widget 124, such as a name of the customized widget 124, with the customized dashboard 122.

Figure 2:
FIG. 2 illustrates an example user interface of a user interface management platform, in accordance with one or more implementations.
Figure 2:
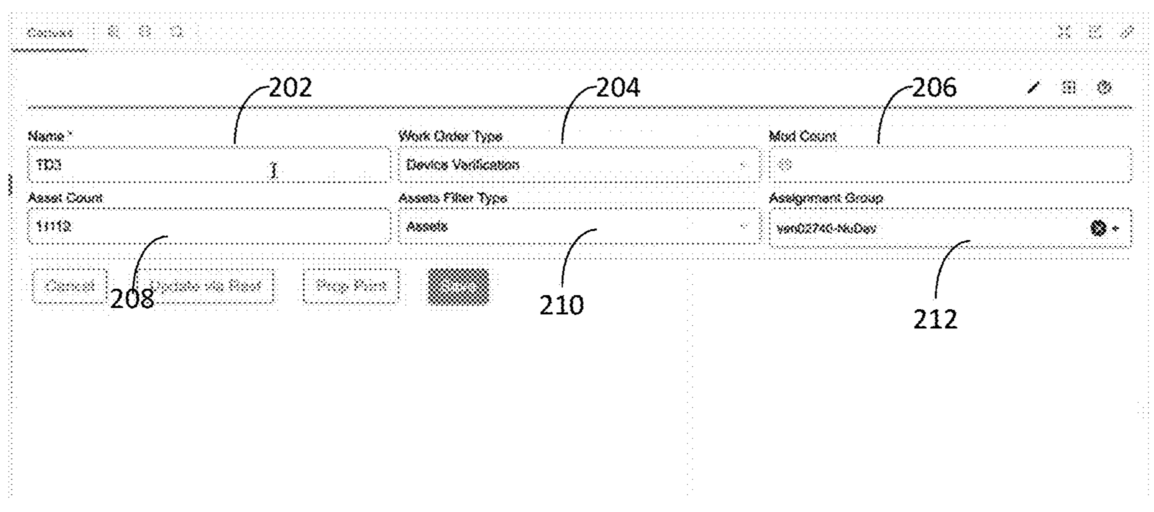

FIG. 2 illustrates an example user interface 200 of a user interface management platform, in accordance with one or more implementations. The user interface 200 may be used, for example, in an application with an edit button to edit an interface. For example, the user interface management platform 110 may display the user interface 200 in response to receiving a user input directed to the edit button in connection with a selected widget. The user interface 200 may include entry fields that are associated with editable properties of the selected widget. An entry field may be configured to receive a text input. For example, a first entry field 202 may be configured to receive a text input corresponding to a name of the selected widget. A second entry field 204 may be configured to receive a user selection from a drop down menu, e.g., displaying options for a work order type of the selected widget. A third entry field 206 may be configured to display a modification count corresponding to a number of modifications made to the selected widget. The third entry field 206 may be configured as a read-only field.

An entry field may be configured to receive a script to assign to an editable property of the selected widget. For example, a fourth entry field 208 may be configured to receive a script for determining an asset count corresponding to a number of assets, e.g., registered in a system. A fifth entry field 210 may be configured to receive a user selection of a filter type (e.g., to display assets) from among multiple filter types. A sixth entry field 212 may be configured to receive a user selection from a drop down menu, e.g., selecting an assignment group from among multiple assignment groups. One or more of the fourth entry field 208, the fifth entry field 210, or the sixth entry field 212 may be configured to receive a script for controlling a behavior of the selected widget with respect to an editable property. For example, a script may be used to cause the widget to be visible or hidden to all users or to a subset of users. In some implementations, a script may be used to cause the widget to be read-only or write-capable to all users or to a subset of users. For example, the script may cause the widget to be read-only for a first subset of users and write-capable for a second subset of users. In some implementations, a script may be used to selectively enable or disable the script for all users or for a subset of users. For example, the script may cause the widget to be disabled for a first subset of users and may enable a second subset of users to access the widget.

Figure 3:
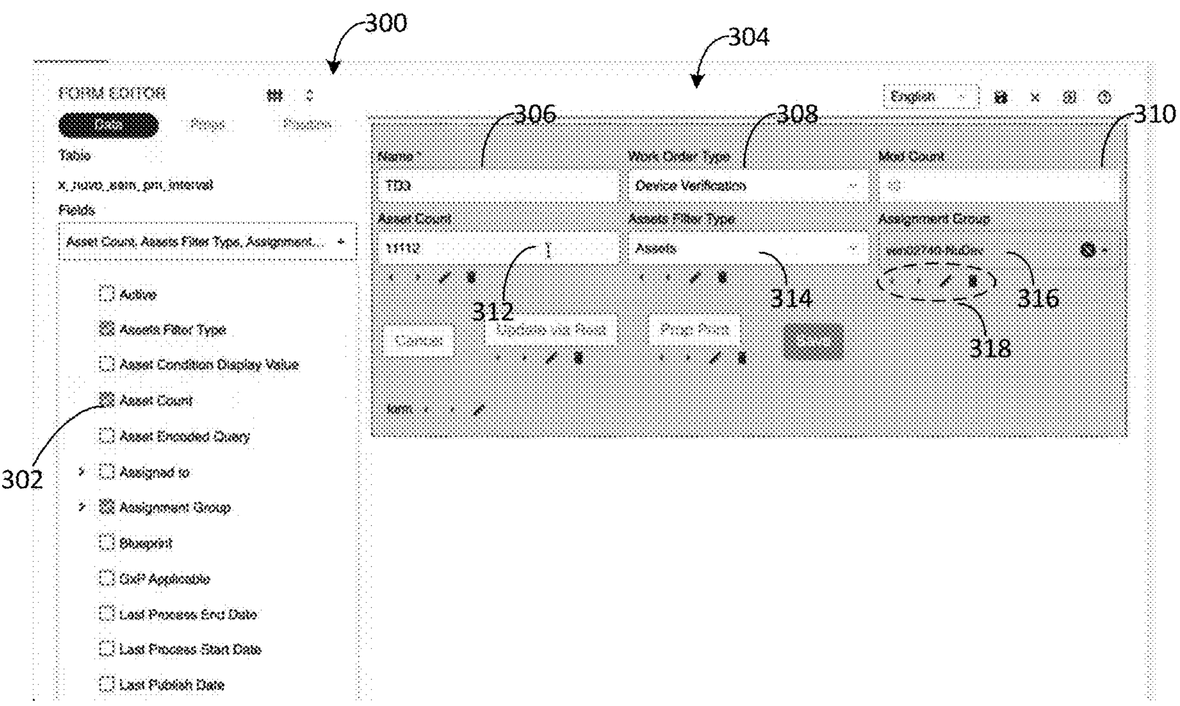
FIGS. 3, 4, 5, and 6 illustrate example user interfaces for customizing a widget in a user interface management platform, in accordance with one or more implementations.

FIGS. 3, 4, 5, and 6 illustrate example user interfaces for customizing a widget in a user interface management platform, in accordance with one or more implementations. FIG. 3 illustrates an example user interface 300 for adding an additional field to a form. The user interface 300 may include selection boxes 302 for selecting or deselecting fields to add to a form 304. The form 304 may have a first entry field 306 that is configured to receive a text input corresponding to a name of the selected widget. A second entry field 308 may be configured to receive a user selection from a drop down menu, e.g., displaying options for a work order type of the selected widget. A third entry field 310 may be configured to display a modification count corresponding to a number of modifications made to the selected widget. The third entry field 310 may be configured as a read-only field.

An entry field may be configured to receive a script to assign to an editable property of the selected widget. For example, a fourth entry field 312 may be configured to receive a script for determining an asset count corresponding to a number of assets, e.g., registered in a system. A fifth entry field 314 may be configured to receive a user selection of a filter type (e.g., to display assets) from among multiple filter types. A sixth entry field 316 may be configured to receive a user selection from a drop down menu, e.g., selecting an assignment group from among multiple assignment groups. One or more of the fourth entry field 312, the fifth entry field 314, or the sixth entry field 316 may be configured to receive a script for controlling a behavior of the selected widget with respect to an editable property. For example, a script may be used to cause the widget to be visible or hidden to all users or to a subset of users. In some implementations, a script may be used to cause the widget to be read-only or write-capable to all users or to a subset of users. For example, the script may cause the widget to be read-only for a first subset of users and write-capable for a second subset of users. In some implementations, a script may be used to selectively enable or disable the script for all users or for a subset of users. For example, the script may cause the widget to be disabled for a first subset of users and may enable a second subset of users to access the widget.

In some implementations, a set of controls 318 appearing near (e.g., below) an entry field may indicate that the entry field may receive a script. The set of controls 318 may include, for example, directional controls for stepping forward or backward through a received script, an edit control for editing a script, and/or a deletion control for deleting a script that is currently associated with an entry field.

Figure 4:
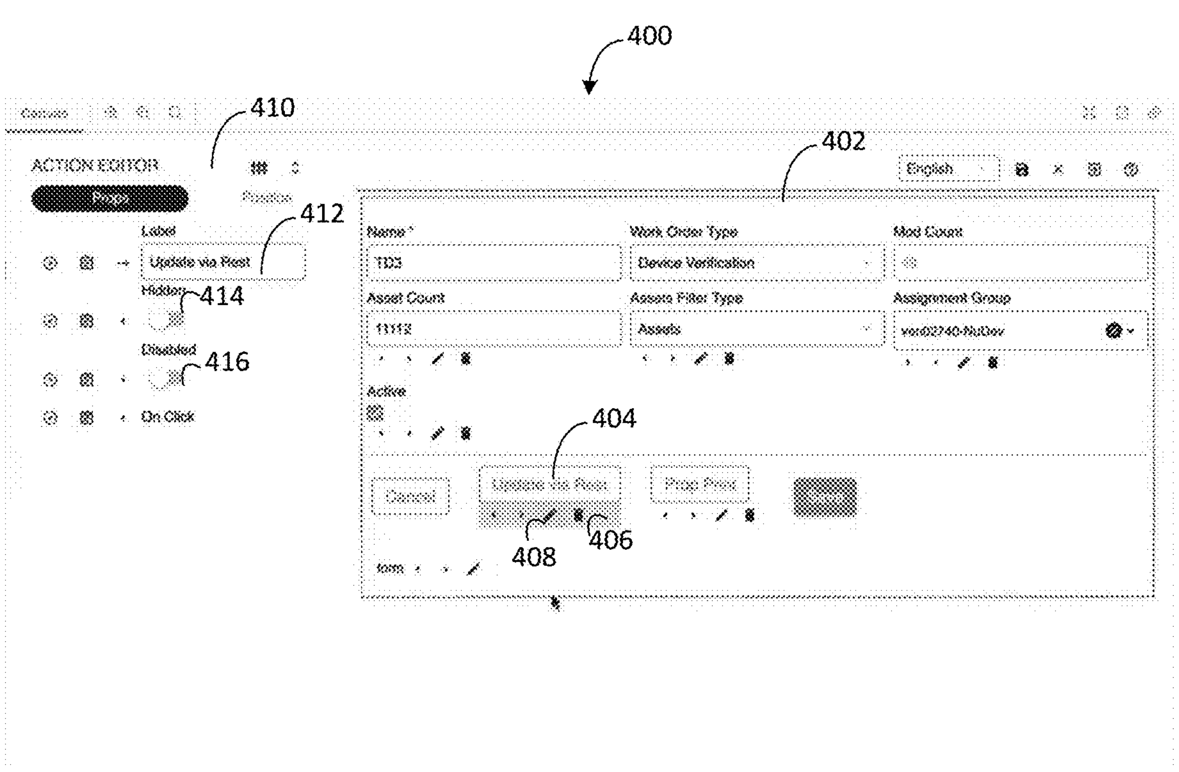

FIG. 4 illustrates an example user interface 400 for editing an editable property of a widget on a form. For example, a form 402 may have an editable property 404. A set of controls 406 may be displayed near (e.g., below) the editable property 404. The set of controls 406 may include an edit control 408. The edit control 408 may, in response to receiving a user input directed to it, cause a user interface 410 to be displayed. The user interface 410 may include an entry field 412 for receiving a text entry to configure a name of the editable property 404. The user interface 410 may include a toggle control 414 for controlling whether the editable property 404 is hidden or visible. The user interface 410 may include a toggle control 416 for controlling whether the editable property 404 is enabled or disabled.

Figure 5:
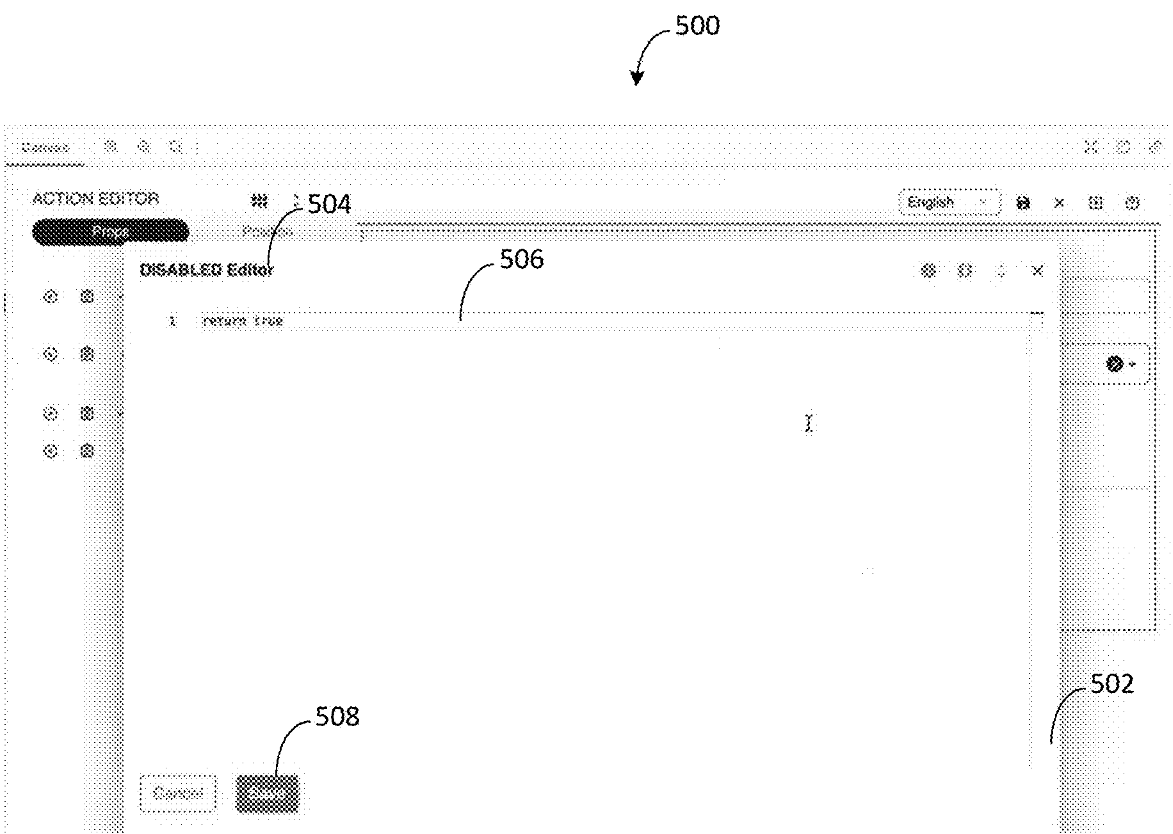

FIG. 5 illustrates an example user interface 500 for assigning a customized script to control a behavior of an editable property of a widget on a form. For example, the user interface management platform may display the user interface 500 in response to receiving a user input corresponding to a command to assign a script to the editable property of the widget. The user interface 500 may include an entry field 502 for receiving a script. The entry field 502 may have a title 504 that identifies the script that is being received or input. In some implementations, the user may enter the script in a text entry area 506. In some implementations, the user may copy and paste the script into the text entry area 506, e.g., from a clipboard. In some implementations, the user may import the script from an external source, such as a file. When the user has finished entering the script, the user may direct a user input to a save button 508 to save the script, assign the script to the editable property, and exit the entry field 502.

Figure 6:

FIG. 6 illustrates an example user interface 600 for assigning a customized script to control a behavior of an editable property of a widget on a form. For example, the user interface management platform may display the user interface 600 in response to receiving a user input directed to the save button 508 and exiting the entry field 502 of FIG. 5. The user interface management platform may alter a visual appearance of an editable property 602 to indicate that the customized script has been assigned to the editable property 602. For example, as shown in FIG. 6, the user interface management platform may cause the editable property 602 to be displayed in a different color than other areas of the user interface 600, e.g., the editable property 602 may be highlighted. In some implementations, the appearance of the editable property 602 may be altered in other ways, e.g., by increasing the line width of the editable property 602, by making the editable property 602 appear to blink, etc.

Figure 7:
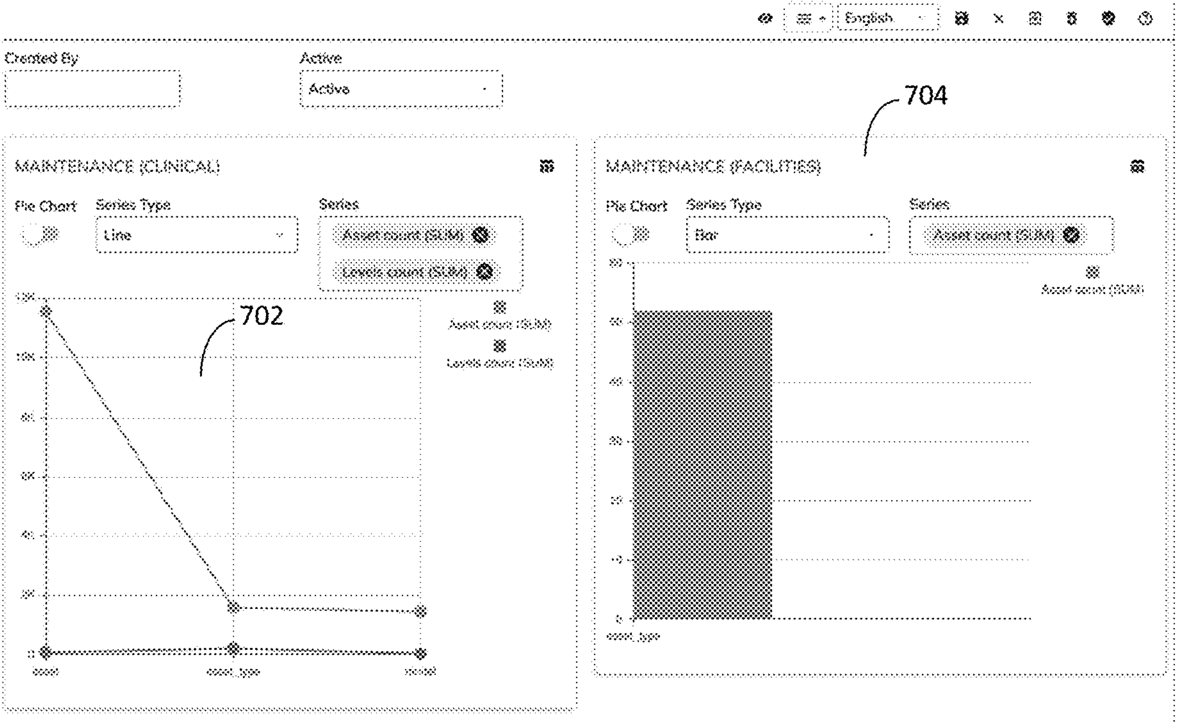
FIG. 7 illustrates example widgets configured in a user interface management platform, in accordance with one or more implementations.

FIG. 7 illustrates example widgets configured in a user interface management platform, in accordance with one or more implementations. The example widgets may include, e.g., a line graph widget 702 and/or a bar graph widget 704. In some implementations, the line graph widget 702 and/or the bar graph widget 704 may display graphical representations of data, e.g., assets data. The line graph widget 702 and the bar graph widget 704 may display different visualizations of the data. For example, the line graph widget 702 may be configured with a table data source selector so that individual data sources may be displayed. The data sources may include active data sources (e.g., an asset count data source) and/or inactive data sources (e.g., a levels count data source). In some implementations, the bar graph widget 704 may be configured with an aggregate selector so that aggregated data (e.g., a total asset count) may be displayed.

Figure 8:
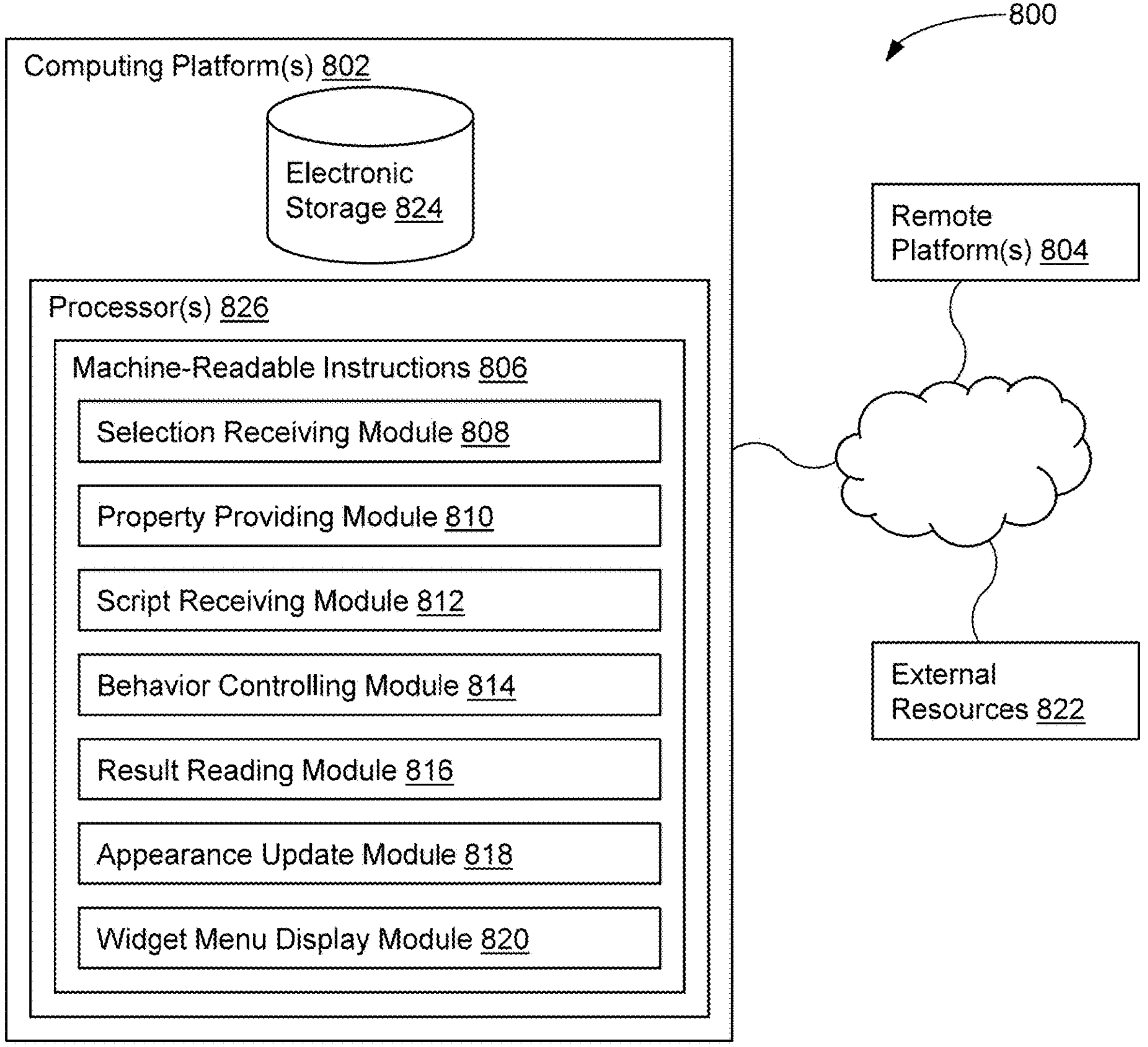
FIG. 8 illustrates a system configured for providing a dynamic user interface management platform, according to some embodiments of the present disclosure.

FIG. 8 illustrates a system 800 configured for providing a dynamic user interface management platform, in accordance with one or more embodiments. In some implementations, the system 800 implements the computer system 100 of FIG. 1. In some embodiments, system 800 may include a computing platform 802. Computing platform(s) 802 may be configured to communicate with one or more remote platforms 804 according to a client/server architecture, a peer-to-peer architecture, and/or other architectures. Remote platform(s) 804 may be configured to communicate with other remote platforms via computing platform(s) 802 and/or according to a client/server architecture, a peer-to-peer architecture, and/or other architectures. Users may access system 800 via remote platform(s) 804.

Computing platform(s) 802 may be configured by machine-readable instructions 806. Machine-readable instructions 806 may include one or more instruction modules. The instruction modules may include computer program modules. The instruction modules may include one or more of selection receiving module 808, property providing module 810, script receiving module 812, behavior controlling module 814, result reading module 816, appearance update module 818, widget menu display module 820, and/or other instruction modules. The instruction modules may implement one or more of the routing subsystem 112, the properties subsystem 114, or the scripting subsystem 116 of FIG. 1.

Selection receiving module 808 may be configured to receive, at a user interface and using at least one processor associated with a user interface management platform, a selection of a widget to include in a customized dashboard, such as the customized dashboard 122 of FIG. 1. The selection of the widget may be received in response to a displayed set of available widgets. Including the widget in the customized dashboard may include associating a graphic representation of the widget with the customized dashboard. Including the widget in the customized dashboard may include associating an identifier of the widget with the customized dashboard. The customized dashboard may include a plurality of widgets.

Property providing module 810 may be configured to provide, at the user interface and by the user interface management platform, an editable property of the selected widget. By way of non-limiting example, the editable property of the selected widget may include at least one of a type of the selected widget, a name of the selected widget. By way of non-limiting example, an indicator of whether the selected widget may be read-only, an indicator of whether the selected widget is hidden, or an indicator of whether the selected widget is disabled. The script may include a plurality of instructions that, when executed by the at least one processor, cause a value to be assigned to the editable property. Assigning the script to the editable property may include executing the instructions on a condition that the editable property is selected.

The editable property associated with an entry field for may receive a script to assign to the editable property. The entry field may include a text field configured to receive a user input corresponding to the script.

Script receiving module 812 may be configured to receive, at the entry field and using the at least one processor, the script for controlling a behavior of the editable property of the selected widget. By way of non-limiting example, the behavior may include one or more of the following: disabling writing to the selected widget to one or more users, disabling viewing of the selected widget by one or more users, or disabling the selected widget for one or more users. By way of non-limiting example, the behavior may include one or more of hiding information, deactivating a property, or filtering information. Deactivating the property may include disabling access to the property by one or more users. The script may include a plurality of instructions to be assigned to the editable property to characterize the behavior of the editable property. Characterizing the behavior of the editable property may include providing one or more contingent rules for associating a value with the editable property.

Behavior controlling module 814 may be configured to control, using the at least one processor and as a result of the received customized script, the behavior of the selected widget.

Result reading module 816 may be configured to read, as a result of the received script and using the at least one processor, the script for determining how to process information associated with the widget. Reading the script may include performing one or more operations on the information associated with the widget based on the at least one instruction. The information associated with the widget may include data to be represented by the widget. The editable property may define how information associated with the widget is received or how the information is displayed. Hiding information may include omitting displaying the information for one or more users.

Filtering information may include applying one or more filtering criteria to the information. Filtering information may include displaying a portion of the information based on applying the one or more filtering criteria.

Appearance update module 818 may be configured to dynamically update an appearance of the customized dashboard based on the received script. The appearance of the customized dashboard may include at least one of the following a set of widgets that are displayed on the customized dashboard or an arrangement of widgets on the customized dashboard. By way of non-limiting example, dynamically updating the appearance of the customized dashboard may include at least one of the following changing the set of widgets that are displayed on the customized dashboard based on the received script, or changing the arrangement of widgets on the customized dashboard.

Widget menu display module 820 may be configured to simultaneously display, on the user interface and using the at least one processor, a widget customizing menu and a dashboard layout. By way of non-limiting example, the widget customizing menu may include at least one of the following an affordance for editing the selected widget, or at least one text field displaying the editable property of the selected widget. The dashboard layout may include a graphical representation of the customized dashboard and respective graphical representations of one or more widgets.

In some implementations, by way of non-limiting example, the widget may include one or more of a form, table, chart, button, list, container, tab, text, or block. In some implementations, reading the script may include obtaining at least one instruction from the script.

In some embodiments, computing platform(s) 802, remote platform(s) 804, and/or external resources 822 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which computing platform(s) 802, remote platform(s) 804, and/or external resources 822 may be operatively linked via some other communication media.

A given remote platform 804 may include one or more processors configured to execute computer program modules. The computer program modules may be configured to enable an expert or user associated with the given remote platform 804 to interface with system 800 and/or external resources 822, and/or provide other functionality attributed herein to remote platform(s) 804. By way of non-limiting example, a given remote platform 804 and/or a given computing platform 802 may include one or more of a server, a desktop computer, a laptop computer, a handheld computer, a tablet computing platform, a NetBook, a Smartphone, a gaming console, and/or other computing platforms.

External resources 822 may include sources of information outside of system 800, external entities participating with system 800, and/or other resources. In some embodiments, some or all of the functionality attributed herein to external resources 822 may be provided by resources included in system 800.

Computing platform(s) 802 may include electronic storage 824, one or more processors 826, and/or other components. Computing platform(s) 802 may include communication lines, or ports to enable the exchange of information with a network and/or other computing platforms. Illustration of computing platform(s) 802 in FIG. 8 is not intended to be limiting. Computing platform(s) 802 may include a plurality of hardware, software, and/or firmware components operating together to provide the functionality attributed herein to computing platform(s) 802. For example, computing platform(s) 802 may be implemented by a cloud of computing platforms operating together as computing platform(s) 802.

Electronic storage 824 may comprise non-transitory storage media that electronically stores information. The electronic storage media of electronic storage 824 may include one or both of system storage that is provided integrally (i.e., substantially non-removable) with computing platform(s) 802 and/or removable storage that is removably connectable to computing platform(s) 802 via, for example, a port (e.g., a USB port, a firewire port, etc.) or a drive (e.g., a disk drive, etc.). Electronic storage 824 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 824 may include one or more virtual storage resources (e.g., cloud storage, a virtual private network, and/or other virtual storage resources). Electronic storage 824 may store software algorithms, information determined by processor(s) 826, information received from computing platform(s) 802, information received from remote platform(s) 804, and/or other information that enables computing platform(s) 802 to function as described herein.

Processor(s) 826 may be configured to provide information processing capabilities in computing platform(s) 802. As such, processor(s) 826 may include one or more of a digital processor, an analog processor, a digital circuit designed to process information, an analog circuit designed to process information, a state machine, and/or other mechanisms for electronically processing information. Although processor(s) 826 is shown in FIG. 8 as a single entity, this is for illustrative purposes only. In some embodiments, processor(s) 826 may include a plurality of processing units. These processing units may be physically located within the same device, or processor(s) 826 may represent processing functionality of a plurality of devices operating in coordination. Processor(s) 826 may be configured to execute modules 808, 810, 812, 814, 816, 818, and/or 820, and/or other modules. Processor(s) 826 may be configured to execute modules 808, 810, 812, 814, 816, 818, and/or 820, and/or other modules by software; hardware; firmware; some combination of software, hardware, and/or firmware;

and/or other mechanisms for configuring processing capabilities on processor(s) 826. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 808, 810, 812, 814, 816, 818, and/or 820 are illustrated in FIG. 8 as being implemented within a single processing unit, in embodiments in which processor(s) 826 includes multiple processing units, one or more of modules 808, 810, 812, 814, 816, 818, and/or 820 may be implemented remotely from the other modules. The description of the functionality provided by the different modules 808, 810, 812, 814, 816, 818, and/or 820 described below is for illustrative purposes, and is not intended to be limiting, as any of modules 808, 810, 812, 814, 816, 818, and/or 820 may provide more or less functionality than is described. For example, one or more of modules 808, 810, 812, 814, 816, 818, and/or 820 may be eliminated, and some or all of its functionality may be provided by other ones of modules 808, 810, 812, 814, 816, 818, and/or 820. As another example, processor(s) 826 may be configured to execute one or more additional modules that may perform some or all of the functionality attributed below to one of modules 808, 810, 812, 814, 816, 818, and/or 820.

Figure 9:
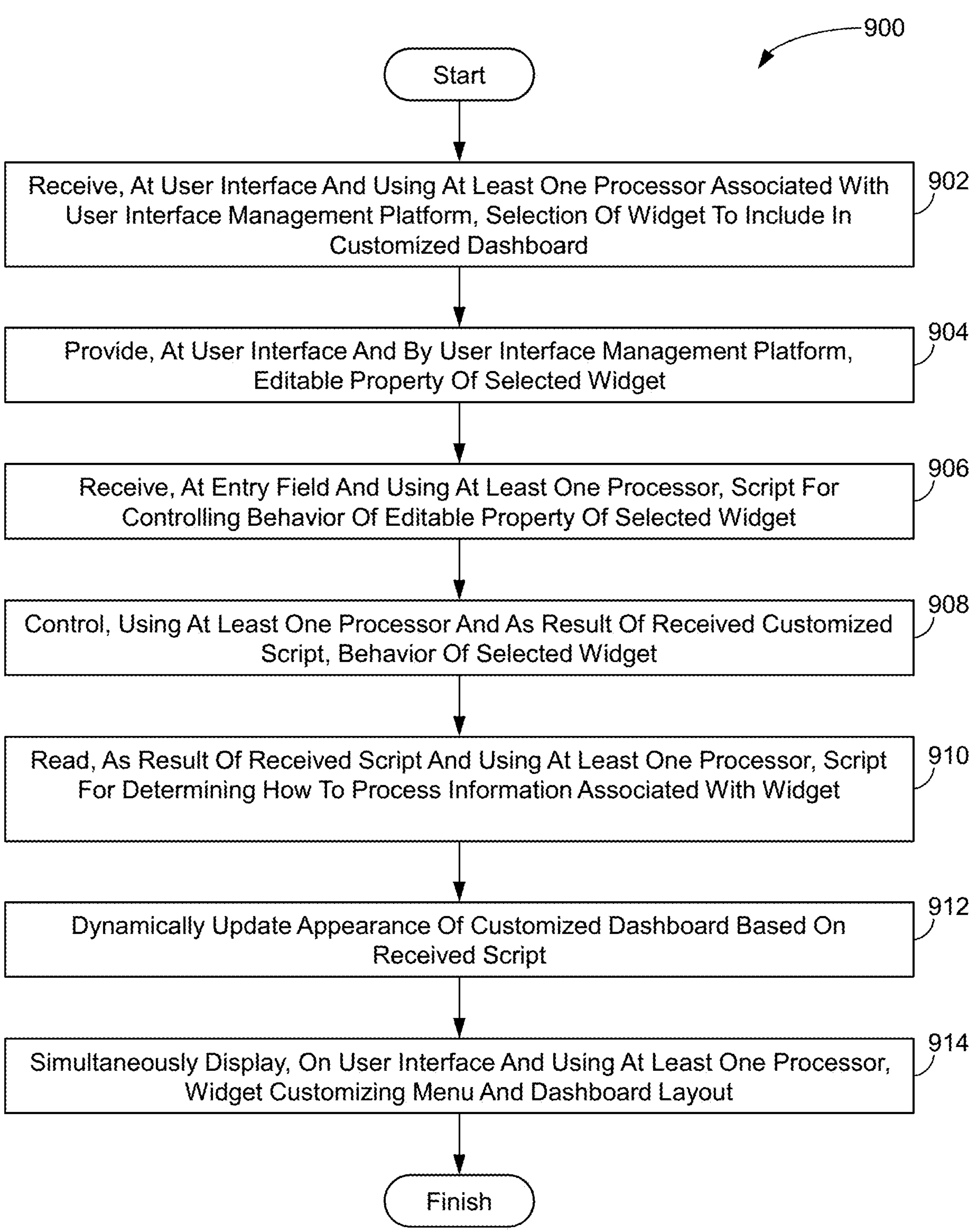
FIG. 9 illustrates an example process for providing a dynamic user interface management platform, according to some embodiments of the present disclosure.

FIG. 9 illustrates an example process 900 for providing a dynamic user interface management platform, according to some embodiments of the present disclosure. The operations of process 900 may be performed, for example, by the computer system 100 of FIG. 1 and/or the computing platform(s) 802 of FIG. 8. The operations of process 900 presented below are intended to be illustrative. In some embodiments, process 900 may be accomplished with one or more additional operations not described, and/or without one or more of the operations discussed. Additionally, the order in which the operations of process 900 are illustrated in FIG. 9 and described below is not intended to be limiting.

In some embodiments, process 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 900 in response to instructions stored electronically on an electronic storage medium. The one or more processing devices may include one or more devices configured through hardware, firmware, and/or software to be specifically designed for execution of one or more of the operations of process 900.

At block 902, in some embodiments, process 900 may include at least one processor receiving, at a user interface and using at least one processor associated with a user interface management platform, a selection of a widget to include in a customized dashboard. The at least one processor may be configured by selection receiving module 808, in accordance with one or more embodiments.

At block 904, in some embodiments, process 900 may include at least one processor providing, at the user interface and by the user interface management platform, an editable property of the selected widget. The editable property associated with an entry field for may receive a script to assign to the editable property. The at least one processor may be configured by property providing module 810, in accordance with one or more embodiments.

At block 906, in some embodiments, process 900 may include at least one processor receiving, at the entry field and using the at least one processor, the script for controlling a behavior of the editable property of the selected widget. The at least one processor may be configured by script receiving module 812, in accordance with one or more embodiments.

At block 908, in some embodiments, process 900 may include at least one processor controlling, using the at least one processor and as a result of the received customized script, the behavior of the selected widget. The at least one processor may be configured by behavior controlling module 814, in accordance with one or more embodiments.

At block 910, in some embodiments, process 900 may include at least one processor reading, as a result of the received script and using the at least one processor, the script for determining how to process information associated with the widget. The at least one processor may be configured by result reading module 816, in accordance with one or more embodiments.

At block 912, in some embodiments, process 900 may include at least one processor dynamically updating an appearance of the customized dashboard based on the received script. The at least one processor may be configured by appearance update module 818, in accordance with one or more embodiments.

At block 914, in some embodiments, process 900 may include at least one processor simultaneously displaying, on the user interface and using the at least one processor, a widget customizing menu and a dashboard layout. The at least one processor may be configured by widget menu display module 820, in accordance with one or more embodiments.

Figure 10:
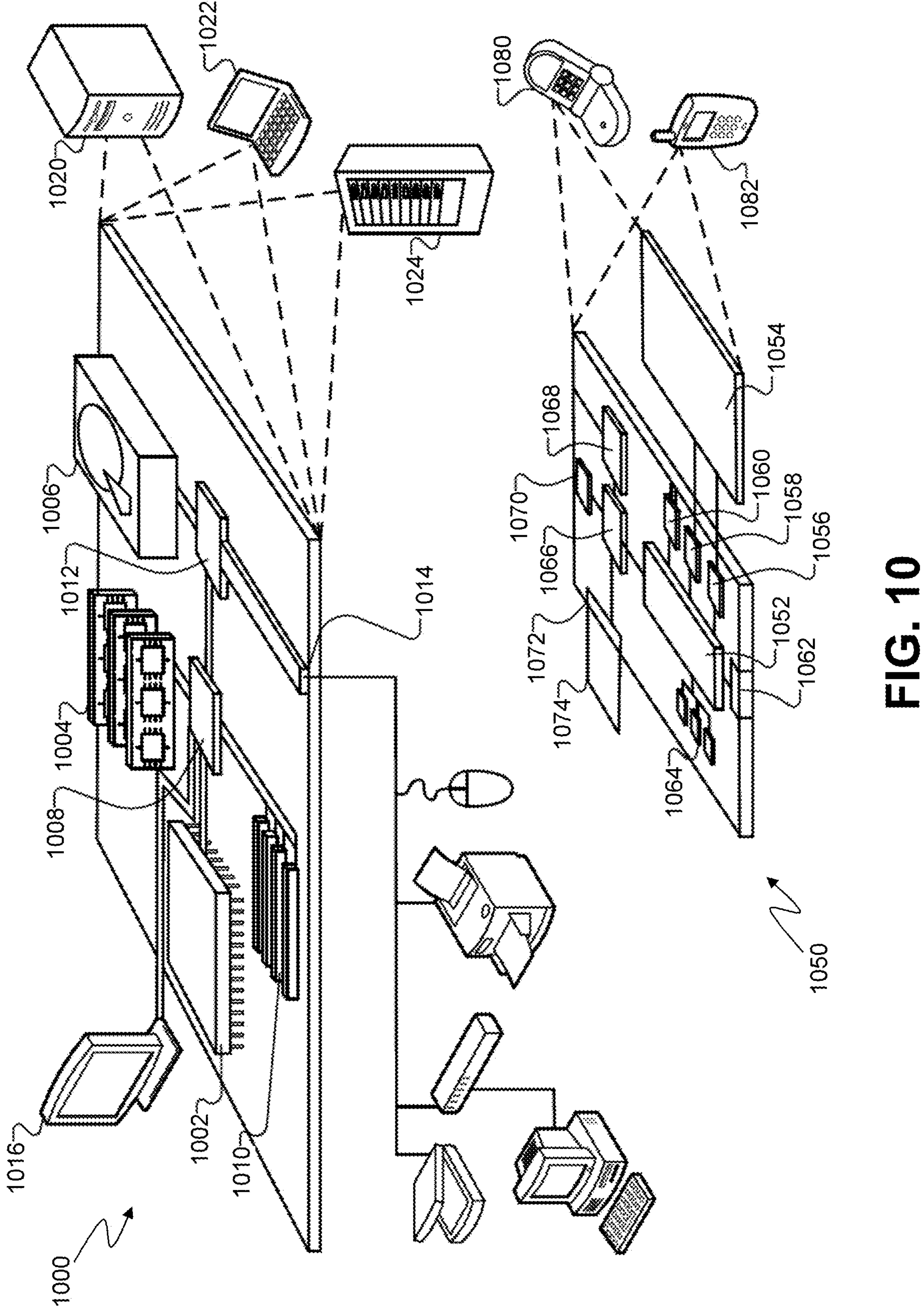
FIG. 10 is a diagram of an example computer system, according to some embodiments of the present disclosure.

FIG. 10 is a block diagram of computing devices 1000, 1050 that may be used to implement the systems and methods described in this document, as either a client or as a server or plurality of servers. Computing device 1000 or the computing device 1050, or both, may implement the computer system 100 of FIG. 1 and/or the computing platform(s) 800 of FIG. 8. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed controller 1008 connecting to memory 1004 and high-speed expansion ports 1010, and a low-speed interface 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed controller 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a non-transitory computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a non-transitory computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a non-transitory computer- or machine-readable medium, such as the memory 1004, the storage device 1006, or memory on processor 1002.

The high-speed controller 1008 manages bandwidth-intensive operations for the computing device 1000, while the low-speed interface 1012 manages lower bandwidth-intensive operations. Such allocation of duties is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed interface 1012 is coupled to storage device 1006 and low-speed bus 1014 (e.g., low speed expansion port). The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device, such as the computing device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The computing device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can process instructions for execution within the computing device 1050, including instructions stored in the memory 1064. The processor may also include separate analog and digital processors. The processor may provide, for example, for coordination of the other components of the computing device 1050, such as control of user interfaces, applications run by computing device 1050, and wireless communication by computing device 1050.

Processor 1052 may communicate with a user through control interface 1058 and display interface 1056 coupled to a display 1054. The display 1054 may be, for example, a thin-film-transistor liquid-crystal display (TFT LCD) display or an organic light-emitting diode (OLED) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of the computing device 1050 with other devices. External interface 1062 may provide, for example, for wired communication (e.g., via a docking procedure) or for wireless communication (e.g., via Bluetooth or other such technologies).

The memory 1064 stores information within the computing device 1050. In one implementation, the memory 1064 is a non-transitory computer-readable medium. In one implementation, the memory 1064 is a volatile memory unit or units. In another implementation, the memory 1064 is a non-volatile memory unit or units. Expansion memory 1074 may also be provided and connected to computing device 1050 through expansion interface 1072, which may include, for example, a SIMM card interface. Such expansion memory 1074 may provide extra storage space for computing device 1050, or may also store applications or other information for computing device 1050. Specifically, expansion memory 1074 may include instructions to carry out or supplement the processes described above, and may include secure information also. Thus, for example, expansion memory 1074 may be provided as a security module for computing device 1050, and may be programmed with instructions that permit secure use of computing device 1050. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052.

Computing device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1068 (e.g., radio-frequency transceiver). In addition, short-range communication may occur, such as using a Bluetooth, WiFi, or other such transceiver (not shown). In addition, GPS receiver module 1070 may provide additional wireless data to the computing device 1050, which may be used as appropriate by applications running on computing device 1050.

Computing device 1050 may also communicate audibly using audio codec 1060, which may receive spoken information from a user and convert it to usable digital information. Audio codec 1060 may likewise generate audible sound for a user, such as through a speaker, e.g., in a handset of the computing device 1050. Such sound may include sound from voice telephone calls, may include recorded sound (e.g., voice messages, music files, etc.) and may also include sound generated by applications operating on the computing device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any non-transitory signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A method, comprising:

receiving, at a user interface and using at least one processor associated with a user interface management platform, a selection of a widget to include in a customized dashboard;

providing, at the user interface and by the user interface management platform, an editable property of the selected widget, the editable property associated with an entry field for receiving a script to assign to the editable property;

receiving, at the entry field and using the at least one processor, the script for controlling a behavior of the editable property of the selected widget for a plurality of users, wherein the editable property of the selected widget includes that the selected widget is read-only for a first subset of the plurality of users and write-capable for a second subset of the plurality of users; and controlling, using the at least one processor and as a result of the received customized script, the behavior of the selected widget.

2. The method of claim 1, wherein the selection of the widget is received in response to a displayed set of available widgets.

3. The method of claim 1, wherein including the widget in the customized dashboard includes associating a graphic representation of the widget with the customized dashboard.

4. The method of claim 1, wherein including the widget in the customized dashboard includes associating an identifier of the widget with the customized dashboard.

5. The method of claim 1, wherein the customized dashboard includes a plurality of widgets.

6. The method of claim 1, wherein the editable property of the selected widget includes at least one of a type of the selected widget, a name of the selected widget, an indicator of whether the selected widget is read-only, an indicator of whether the selected widget is hidden, or an indicator of whether the selected widget is disabled.

7. The method of claim 1, wherein the script includes a plurality of instructions that, when executed by the at least one processor, cause a value to be assigned to the editable property.

8. A system, comprising:

one or more hardware processors configured by machine-readable instructions to:

receive, at a user interface and using at least one processor associated with a user interface management platform, a selection of a widget to include in a customized dashboard;

provide, at the user interface and by the user interface management platform, an editable property of the selected widget, the editable property associated with an entry field for receiving a script to assign to the editable property;

receive, at the entry field and using the at least one processor, the script for controlling a behavior of the editable property of the selected widget for a plurality of users, wherein the editable property of the selected widget includes that the selected widget is read-only for a first subset of the plurality of users and write-capable for a second subset of the plurality of users; and control, using the at least one processor and as a result of the received customized script, the behavior of the selected widget.

9. The system of claim 8, wherein the selection of the widget is received in response to a displayed set of available widgets.

10. The system of claim 8, wherein including the widget in the customized dashboard includes associating a graphic representation of the widget with the customized dashboard.

11. The system of claim 8, wherein including the widget in the customized dashboard includes associating an identifier of the widget with the customized dashboard.

12. The system of claim 8, wherein the customized dashboard includes a plurality of widgets.

13. The system of claim 8, wherein the editable property of the selected widget includes at least one of a type of the selected widget, a name of the selected widget, an indicator of whether the selected widget is read-only, an indicator of whether the selected widget is hidden, or an indicator of whether the selected widget is disabled.

14. The system of claim 8, wherein the script includes a plurality of instructions that, when executed by the at least one processor, cause a value to be assigned to the editable property.

15. A non-transitory computer readable medium (CRM) comprising at least one program for execution by at least one processor of a system, the at least one program including instructions which, when executed by the at least one processor, cause The system to perform operations comprising:

receiving, at a user interface and using at least one processor associated with a user interface management platform, a selection of a widget to include in a customized dashboard;

providing, at the user interface and by the user interface management platform, an editable property of the selected widget, the editable property associated with an entry field for receiving a script to assign to the editable property;

receiving, at the entry field and using the at least one processor, the script for controlling a behavior of the editable property of the selected widget for a plurality of users, wherein the editable property of the selected widget includes that the selected widget is read-only for a first subset of the plurality of users and write-capable for a second subset of the plurality of users; and controlling, using the at least one processor and as a result of the received customized script, the behavior of the selected widget.

16. The CRM of claim 15, wherein the selection of the widget is received in response to a displayed set of available widgets.

17. The CRM of claim 15, wherein including the widget in the customized dashboard includes associating a graphic representation of the widget with the customized dashboard.

18. The CRM of claim 15, wherein including the widget in the customized dashboard includes associating an identifier of the widget with the customized dashboard.

19. The CRM of claim 15, wherein:

the customized dashboard includes a plurality of widgets; and the script includes a plurality of instructions that, when executed by the at least one processor, cause a value to be assigned to the editable property.

20. The CRM of claim 15, wherein the editable property of the selected widget includes at least one of a type of the selected widget, a name of the selected widget, an indicator of whether the selected widget is read-only, an indicator of whether the selected widget is hidden, or an indicator of whether the selected widget is disabled.

* * * * *